United States Patent [19]

Malott

[11] Patent Number: 4,886,687

[45] Date of Patent: Dec. 12, 1989

[54] PASSIVE, REUSABLE DEVICE FOR AMUSEMENT OR FOR WARNING

[75] Inventor: Michael W. Malott, Antioch, Calif.

[73] Assignee: 3-D Dan, Inc., Walnut Creek, Calif.

[21] Appl. No.: 274,576

[22] Filed: Nov. 22, 1988

[51] Int. Cl.$^4$ .............................................. D04D 7/08
[52] U.S. Cl. ................................ 428/4; 28/147; 116/63 P; 404/9; 428/30
[58] Field of Search ............ 428/4, 7, 30; 28/147; 116/63 P; 264/146; 350/162.18; 404/9

[56] References Cited

U.S. PATENT DOCUMENTS

| | | | |
|---|---|---|---|
| 2,968,890 | 1/1961 | De Nisco | 428/7 X |
| 3,011,383 | 12/1961 | Sylvester et al. | 428/30 X |
| 4,055,840 | 10/1977 | Uchytil et al. | 428/4 X |
| 4,201,806 | 5/1980 | Cole | 428/4 |
| 4,369,215 | 1/1983 | Offen et al. | 428/4 |
| 4,385,087 | 5/1983 | Roberts et al. | 428/7 |
| 4,490,419 | 12/1984 | Sliva | 428/4 |

Primary Examiner—Henry F. Epstein
Attorney, Agent, or Firm—Townsend and Townsend

[57] ABSTRACT

A passive, reusable visual amusement or warning device includes a handle and a number of light diffracting strips bearing an embossed holographically generated diffraction pattern. The diffraction pattern in the foil is produced in a planar format, and the strips bearing the pattern are displayed and viewed in a curved format. Ambient light striking the strips is diffracted to produce a dynamic, kaleidoscopic readily noticed display of brilliant colors.

14 Claims, 2 Drawing Sheets

U.S. Patent  Dec. 12, 1989  Sheet 1 of 2  4,886,687
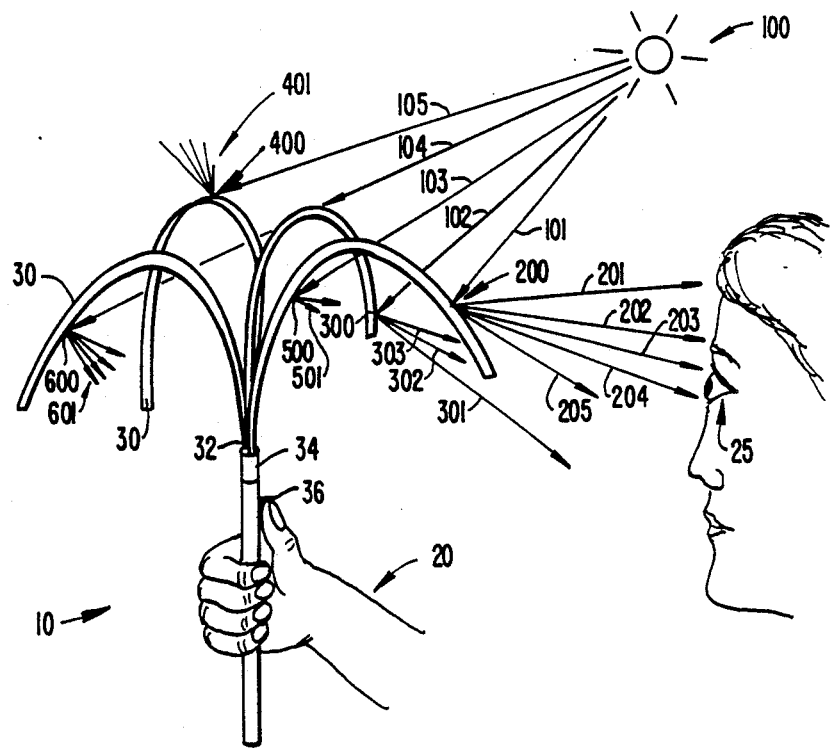
FIG._1.
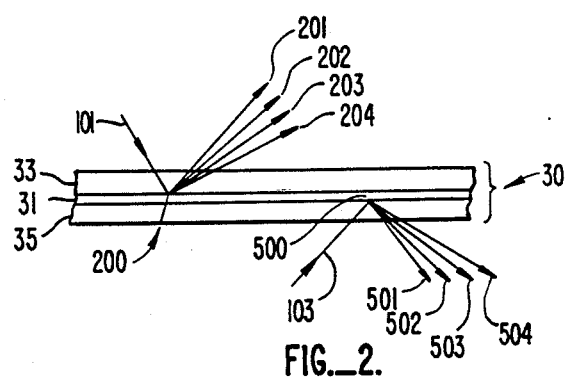
FIG._2.

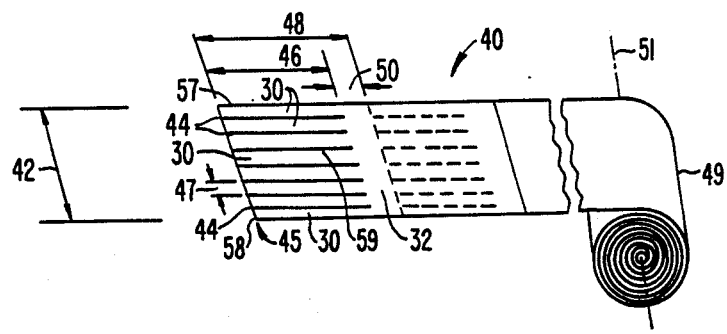
FIG._3A.
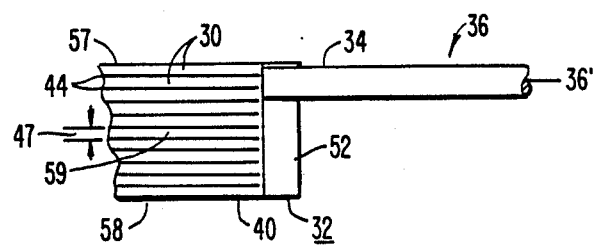
FIG._3B.
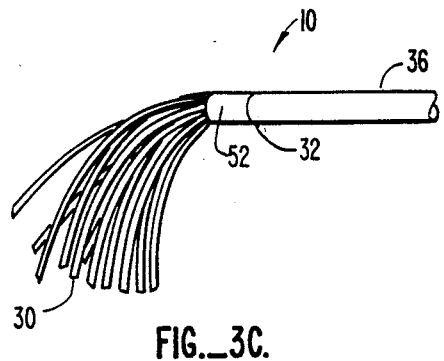
FIG._3C.

PASSIVE, REUSABLE DEVICE FOR AMUSEMENT OR FOR WARNING

BACKGROUND OF THE INVENTION

The invention relates to a passive, reusable hand-held pom-pom-like device that simulates a sparkler. The invention can be used for amusement or as a warning device.

Hand-held devices for visual amusement or warning are known in the art. Offen et al., U.S. Pat. No. 4,369,215, discloses a finger-held pom-pom that includes a number of glossy strips for catching and reflecting light. Sliva, U.S. Pat. No. 4,490,419, discloses a pom-pom having a number of plastic streamers attached to a stick-like handle for amusement. Uchytil, U.S. Pat. No. 4,055,840, discloses a warning device that includes a number of strips made of flexible reflective material attached to the end of a cylindrical flashlight that shines light onto the reflective strips.

While such prior art devices are somewhat amusing and attention grabbing, the use of flexible strips that reflect ambient light limits the usefulness of the devices. Reflective strips can do no more than reflect the ambient light. As an example, if the ambient light is sunlight, the reflective strips will reflect sunlight, i.e., white light. If the ambient light is an orange light, the reflective strips can only reflect the orange light. When used as safety devices, the reflected light is unfortunately easily mistaken for random reflections from, say, water or perhaps a discarded piece of metal.

One attempt at improving the visibility of a reflective device was adopted by Uchytil who incorporated a light source at the base of the reflecting strips. However, while locating a light source proximate to the strips improves the visibility of the reflected light, the light reflected will nonetheless look like the source light.

Another way to improve visibility of a reflective warning or amusement device is through the use of an active chemical reaction. Although amusement or safety devices that use pyrotechnic chemicals such as magnesium to produce a brilliant light display are highly visible, such active devices are potentially dangerous. Such active chemical devices are certainly not suitable for use by unattended children. Further, such devices frequently may be used but once, thus raising their cost.

SUMMARY OF THE INVENTION

The present invention is a passive, reusable hand-held pom-pom-like device that simulates a sparkler. The present invention is capable of producing a brilliant display of crisply separated colors from ambient light, including relatively low intensity ambient light.

Although the ambient light normally includes light of many wavelengths (i.e., many colors), reflective devices such as disclosed by Offen, Sliva, Uchytil are not capable of diffracting or refracting the ambient light into its component spectra and reproducing the colors therein. Such reflective devices have the advantage, however, of being inexpensive to produce in that reflective foil costs only about five cents per square foot. More expensive mechanically ruled diffraction gratings are known in the art and may be produced with approximately 14,000 lines per inch. Unlike reflecting materials, diffracting materials are capable of dividing ambient light into its component spectra and displaying a number of colors. However, the colors so produced may be indistinct, tend to smear together and do not attract attention very well.

What is needed is a passive, reusable hand-held visual amusement or warning device capable of producing a brilliant display of distinctly separated colors from ambient light. Such a display would be highly visible and would not easily be mistaken with random reflections of white light.

The present invention includes a number of flexible strips of light-diffracting foil attached, in a preferred embodiment, at one end to a handle. The strips are preferably cut from a sheet of metallized polyester and embossed with a diffractive pattern. Ambient light is diffracted from the upper and lower surfaces of the strips. Because of the high resolution available with holographic techniques, a preferred embodiment uses a holographically produced diffractive pattern. A holographically produced pattern embossed onto the foil may contain a diffractive feature comparable to gratings with about 5,000 to about 100,000 lines/inch. In a preferred embodiment, the holographically produced pattern is one of a diffraction grating having about 29,000 lines/inch.

Although holographically embossed foil is known in the art, its high cost compared to reflective foil has caused such material not to be experimented with in constructing amusement or warning devices. Holographically embossed foil costs 6 to 30 times as much as reflective foil, and in addition the holographer charges an origination fee of several thousand dollars.

Further, in the past, conventional wisdom was that flat holographically produced media were always displayed in a flat format, and curved holographically produced media were displayed in a curved format. In contrast, the present invention displays a flat holographically produced medium (i.e., the material embossed with a holographically produced diffractive pattern, originally created in a flat photoresist medium) in a curved format (the embossed strips are flexible and allowed to assume random curved shapes). The use of flat holographically produced foil strips in a curved display yields a truly surprising and startling visual result by vividly displaying colors that are crisply separated, even in low ambient light. The resultant device is more visible and more attention attracting than known passive devices.

Until the present invention, it was not known that the high resolution provided by holographically embossed foil streamers would produce vivid, brilliant color separation and eye-catching display. Similarly until the present invention it was not known that foil embossed with a holographically produced pattern of a planar grate could be displayed in a curved format to produce a sparkler-like visual display from a passive, reusable device that may be hand-held.

The visual effect produced by the present invention is surprising. A vivid dynamic display of crisply separated colors is produced as ambient light is diffracted by the foil strips. If the present invention is shaken or twirled or otherwise moved, the visual display becomes even more sparkling. The viewer's eye perceives a spectrum of brilliant colors which change as the viewer's eyes or the strips move. Because each strip is flexible and free to move in different orientations, a ray of ambient light striking two strips typically produces different colors from each strip because the light strikes each strip, and in fact each part of each strip, at different angles. As the strips are moved with the common handle, a sparkling, brilliant kaleidoscopic rainbow effect is achieved.

The present invention is produced by selecting a thin flexible embossable material, such as metallized polyester, embossed with holographically generated diffraction patterns. Alternatively, a mechanically ruled diffraction grating or diffractive material produced by other means could also be used if capable of producing visual effects similar to that produced by holographically generated diffraction gratings. The foil is slit into strips which, in a preferred embodiment, are taped at one end to a handle. The invention may be held in a user's hand and as the strips are moved about, either through motion of the user's hands or through their own motion, a sparkling kaleidoscopic visual display of brilliant colors is produced.

Applicant is not aware of commercially available amusement or warning devices made with strips of mechanically ruled diffracting patterns in a flexibly curved array. Experiments by applicant using mechanically ruled strips demonstrate that the intensity and color separation of light produced by the preferred embodiment of the present invention is substantially and significantly superior to what is produced by either reflective foils or the best mechanically reproduced diffracting patterns.

The present invention is especially useful under low light ambient condition because of the relative brilliance and crisp separation of the colors produced. The present invention is passive, safe and reusable and could, for example, be used as streamers on bicycle handlebars to improve visibility to motorists, especially in dim light. The present invention could be used as a signalling device for lost campers or downed airmen. Because the light diffracted from the present invention includes a spectrum of brilliant colors, the present invention is visibly more discernible and therefore effective than a warning device that merely reflects white or ambient light back at an observer. It is well known that colors and motion increase the visual impact upon an observer. Further, while objects in nature may reflect white light (a glittering rock or discarded piece of metal, for example), the brilliant colorful display produced by the present object is readily discernible from what might be produced by natural objects. A rescue aircraft, for example, would be more likely to observe and investigate the source of a rainbow display of colors than would be the case with a sighting of reflecting white light.

One advantage of the present invention is that a reusable, passive amusement or warning device is advantageously produced, capable of being hand-held and diffracting ambient light to produce a brilliant, sparkling kaleidoscopic display of colored light, to attract the attention of a viewer.

BRIEF DESCRIPTION OF THE DRAWINGS

FIG. 1 is a perspective view of a sparkler according to the present invention, held in a user's hand and illuminated by a light source.

FIG. 2 is an enlarged cross section of one diffracting strip from the sparkler of FIG. 1, showing the diffraction of two light rays.

FIGS. 3A-3C show various steps in the process of manufacturing a sparkler according to the present invention.

DETAILED DESCRIPTION OF THE PREFERRED EMBODIMENT

FIG. 1 shows a sparkler 10 according to the present invention held by a user's hand 20 and viewed by the eye 25 of the user or another person. Sparkler 10 includes a number of flexible strips 30 of light diffracting foil that are attached at one end 32 to the upper end 34 of a handle 36. Strips 30 are cut from a sheet of flexible foil 40 embossed with a holographically produced pattern of diffracting lines.

Sparkler 10 is illuminated by a light source 100 which emanates a plurality of rays designated as 101 through 105. In reality, light source 100 may emanate an infinite number of rays; however, for simplicity's sake, only five rays are shown. If light source 100 is white light, then each ray 101 through 105 will include all colors of the spectrum.

Although the holographically produced pattern used to produce the embossed strips 30 was produced from a flat photoresist medium, strips 30 are flexible and may assume a variety of arcs and curves, as shown in FIG. 1, especially when sparkler 10 is twirled or twisted as shown. As a result, light rays 101-105 striking strips 30 will be diffracted within strips 30 into a plurality of rays encompassing the visual spectrum. As an example, ray 101 is shown as striking a strip 30 at point 200. As ray 101 strikes the strip 30 at point 200, a number of rays will be diffracted away from point 200. For the sake of simplicity, only five rays are shown in FIG. 1, 201-205. These rays correspond to the spectra of the colors of the light included in ray 101. As shown in FIG. 1, some of the rays, 203 and 204, strike eye 25 and are perceived as different colors. Other rays 201 and 205, do not strike the viewer's eye 25 and are not seen at all.

Another viewer (not shown) situated to receive rays 301, 302, 303 diffracted from point 300 from another strip 30 will perceive different color patterns than seen by eye 25. Different patterns are perceived because the foil portion 30 is struck by light ray 102 at a different angle compared to light ray 101, and because the flexion of strip 30 at point 300 is different from the flexion at point 200, thus distorting the holographically produced pattern in a different manner. Similarly a viewer (not shown) situated to receive rays 401 diffracted from point 400, or rays 501 diffracted from ray 500, or rays 601 diffracted from point 600, would see a different display of color patterns in each instance. In reality, substantial portions of the surfaces of strips 30 diffract light rays at a variety of angles with the result that a viewer perceives a dynamic kaleidoscope of brilliant, changing color light patterns as the light source 100, or the strips 30 or the viewer's eye 25 move.

FIG. 2 shows a strip 30 of diffracting foil composed of a thin layer of aluminum 31 whereon a holographically produced pattern of diffracting lines has been embossed (not shown) and two thicker layers of polyester 33 and 35 which protect embossed layer 31. Strip 30 is commercially available and is manufactured by vacuum depositing a very thin layer of aluminum, typically less than 1 micron (0.001 mm), onto a typically 2-mil (0.05 mm) layer of polyester and embossing a holographically produced pattern onto the aluminum surface. After embossing, the aluminized layer is covered with a typically 2-mil (0.05 mm) layer of polyester to protect the embossed pattern.

To produce the visual effects desired according to the present invention, it is preferred that the embossed diffractive pattern be holographically generated. Those skilled in the art recognize that such a pattern is produced by interfering two coherent light beams on a suitable recording medium, such as photoresist, then replicating the resulting surface relief pattern using an embossing process. The efficiency of such holographically produced patterns may be enhanced by a recombination technique wherein the most effective portion of the holographically produced pattern (i.e., the one portion that produces the most brilliant and best color separation) is located and is replicated to produce the final embossing pattern. Such a pattern of embossed holographically produced foil is used in a preferred embodiment and is commercially available from the Diffraction Company in Sparks, Md., and is designated as the "Northern Light Pattern."

As shown in FIG. 2, a beam of light 101 may strike point 200 of strip 30 and cause diffracted rays 201-204 to emanate therefrom, or a ray of light 103 may strike point 500 from the lower side of strip 30, causing rays 501-502 to be diffracted therefrom. It is understood, of course, that in reality, an infinite number of rays 201-204 and 501-504 may be diffracted.

With reference to FIG. 3A, a length of foil 40 bearing the desired embossed holographically produced pattern is taken from a roll 49 having a width 42 of about 2" (5 cm) and having a core axis 51 about which the foil was rolled by the foil manufacturer. A number of parallel slits 44 are cut a distance 46 into end 45 of strip 40. In a preferred embodiment, distance 46 is about 11" (28 cm) and each strip 30 has a width 47 of about 0.125" (0.32 cm). After slits 44 have been cut, foil 40 is cut a distance 48 from end 45, typically about 12" (30 cm). A portion 32 of foil 40 remains unslit, as shown in FIGS. 3A and 3B. Portion 32 has a width 42, about 2" (5 cm) and a length 50, about 1" (2.5 cm).

As shown in FIG. 3B, portion 32 is used to attach the strips 30 to the upper end 34 of handle 36. FIG. 3B is a top view of the foil 40 shown in FIG. 3A. As foil 40 comes off roll 49, the foil will have a tendency to curl into the plane of the drawing at the upper region 57 and lower region 58, while the center region 59 will tend to bow away from the plane of the drawing. It will be appreciated therefore, that attaching the foil 40 to a handle 36 as shown in FIG. 3B causes the foil to be wrapped about an axis 36 ' that is perpendicular to the natural curl axis 51 of the foil. When wrapped as shown in FIG. 3B, strips 30 will tend to curl outwardly and "blossom out" from the longitudinal axis 36' of handle 36, rather than "blossom in" and thus become tangled with one another. A strip 52 of double-sided adhesive tape is attached adhesively over region 32, and region 32 is wrapped axially about upper end 34 of handle 36. In this manner, strips 30 are adhesively attached to handle 36.

FIG. 3C shows the finished sparkler 10 with flexible strips 30 adhesively attached by tape 52 to upper end 32 of handle 36.

Changes and modifications in the specifically described embodiment may be carried out without departing from the scope of the invention, which is intended to be limited only by the scope of the appended claims. For instance, a greater or lesser number of foil strips of different dimensions could be utilized. While double-sided adhesive tape has been disclosed as a means of adhesively attaching the cut strips to the handle, other means of attachment are readily available, such as gluing, heat bonding, forming a coaxial opening in end 34 of the handle into which opening end 32 of the strips is stuffed, or wrapping wire or other material around the rolled-up strip 32. While attachment to an end of handle 36 has been described, attachment to other locations on a handle is possible. Different holographically produced patterns, diffracting patterns produced mechanically or otherwise, may be used to form strips 30, although the resultant device may not be as visually efficient as the preferred embodiment. In addition, strips 30 may be composed of suitably thin flexible material such as polyester, PVC, aluminum foil, or cellophane, and may be metallized or unmetallized, colored or uncolored, again with varying degrees of visual efficiency.

What is claimed is:

1. A reusable, passive amusement or warning device, comprising:
   a plurality of flexible light diffracting strips, said strips being a flexible material including a foil having embossed thereon a diffractive pattern having about 5,000 to about 100,000 lines/inch;
   means for holding the device in a user's hand during use; and
   means for attaching the plurality of strips to the means for holding.

2. The device of claim 1, wherein the strips are formed from an embossed foil bearing a holographically generated diffractive pattern.

3. The device of claim 1, wherein the strips are formed from an embossed foil bearing a mechanically ruled diffractive pattern.

4. The device of claim 1, wherein the means for attaching includes double-sided adhesive tape.

5. The device of claim 1, wherein said means for holding includes a handle.

6. The device of claim 1, wherein the plurality of strips is attached at one end of the strips, and wherein the means for holding is a handle.

7. The device of claim 1, wherein the flexible light diffracting strips have a natural curl axis, and are attached to the means for holding along an axis substantially perpendicular to the natural curl axis.

8. The device of claim 1, wherein the strips include a layer of polyester for protecting the embossed foil.

9. The device of claim 1, wherein the foil has but one layer.

10. A reusable, passive amusement or warning device, comprising:
    a plurality of flexible foil strips, the foil embossed with a holographically generated diffractive pattern having about 5,000 to about 100,000 lines/inch;
    a handle for holding the device in a user's hand during use; and
    means for attaching the plurality of strips to the handle.

11. The device of claim 10, wherein the diffractive pattern has about 29,000 lines/inch.

12. The device of claim 10, wherein the strips have a natural curl axis, and are attached about the handle along an axis substantially perpendicular to the natural curl axis.

13. The device of claim 10, wherein the strips include a layer of polyester for protecting the embossed foil.

14. The device of claim 10, wherein the foil has but one layer.

* * * * *